United States Patent

[11] 3,602,194

| [72] | Inventor | Leif L. Marking |
| | | Onalaska, Wis. |
| [21] | Appl. No. | 9,438 |
| [22] | Filed | Feb. 6, 1970 |
| [45] | Patented | Aug. 31, 1971 |
| [73] | Assignee | The United states of America as represented by the Secretary of the Interior |

[54] METHOD OF FISH CULTURE
7 Claims, No Drawings

[52] U.S. Cl. .................................................. 119/3, 43/4.5
[51] Int. Cl. ................................................. A01k 61/00
[50] Field of Search ........................................... 119/1, 2, 3, 4; 424/331 X, 343

[56] References Cited
UNITED STATES PATENTS
3,389,685  6/1968  MacPhee ........................ 119/3 X

OTHER REFERENCES

Auyong et al. Toxicon " Pharmacological Aspects of Juglone" 1963 Vol. 1, Pages 235–239, Copy in 119-3

Technical Survey, Vol. 23, No. 32, Aug. 26, 1967, Page 561, Lines 4–7 Copy in 43-45

Westfall et al. Science " Depressant Agent from Walnut Shells" Vol. 134, No. 3490, Page 1617, Scien. Lib. Q1.S34

*Primary Examiner*—Aldrich F. Medbery
*Attorneys*—Ernest S. Cohen and Roland H. Shubert ABSTRACT: Efficiency and economy of fish culture techniques all enchanced by destroying all undesirable fish species inhabiting a water body by treatment with juglone, allowing the juglone to degrade to form nontoxic components and thereafter introducing a desired species of fish into the water body.

METHOD OF FISH CULTURE

BACKGROUND OF THE INVENTION

Intensive and efficient development of fish breeding and culture techniques, both for commercial and sport purposes, generally requires complete control over the varieties of fish habitating the water bodies. In order to achieve such control, it is usually necessary to destroy all fish inhabiting a water body and afterward reintroduce fish of the desired species. Generally, this is accomplished by chemical poisoning of all of the fish within a water body.

A number of fish poisons or piscicides have been developed and are in common use. Many of the chlorinated hydrocarbons used as agricultural insecticides also have piscicidal properties. For example, toxaphene (chlorinated camphene having the approximate formula $C_{10}H_{10}Cl_8$) is known to be lethal to fish at field concentrations in the range of 5 to 35 p.p.b. However, a minimum of about 7 months is required for this chemical to degrade or be diluted to nontoxic concentrations.

Other chemicals used as piscicides include rotenone and antimycin A. Rotenone has the disadvantage of also destroying organisms important as fish food. Antimycin A is a powerful fish toxicant, effective for killing most scale fishes at concentrations of 10 p.p.b. or less. However it does not control ictulurids, such as catfish and bullheads, at reasonable concentrations. Additionally, antimycin A is often not sufficiently persistent in high pH waters to be completely effective.

SUMMARY OF THE INVENTION

It has been found that juglone 5-hydroxy-1,4-napthoquinone) has a unique combination of properties which makes it valuable for use in fish culture techniques. Juglone is highly toxic to a wide variety of fish species and its toxicity is not altered significantly in waters of differing temperature and hardness. It has sufficient persistence to be effective yet degrades rapidly enough to allow restocking of fish in a treated water body without undue delay after treatment.

Hence, it is an object of this invention to provide a method of fish culture.

A specific object of this invention is to provide a method for the removal of unwanted varieties of fish from water bodies so as to enhance its value for either sport or commercial fish production.

DETAILED DESCRIPTION OF THE INVENTION

Juglone (5-hydroxy-1,4-napthoquinone) can be isolated from walnut husks of Juglans nigra, J. cinerea, J. regia or Juglandaceae or it can be synthesized by oxidation of 1,5-dihydroxynaphthalene. Extraction of juglone from walnut husks may be accomplished by leaching with ether or other solvents. Purification of the crude extract may be accomplished in a variety of conventional ways including sublimation.

Juglone has been known as a compound for over 100 years and an extensive literature concerning its uses and properties has developed. Many investigators have recognized and reported phytotoxic effects of this compound. Biological activity of the compound toward a wide variety of plants and animals has also been extensively noted. The compound is also known to have a depressant effect on fish and in some cases, investigators have reported juglone to kill fish at relatively low concentrations.

However, up to this time, the unique combination of properties displayed by juglone when used as a piscicide has not been recognized. Juglone kills a wide variety of fish, including the common American trash fish such as carp and bullheads, at relatively low concentrations. Toxic action of the compound is relatively rapid and is not significantly affected by water temperature, hardness or pH. Juglone is sufficiently persistent to produce a thorough and complete fish kill but degrades rapidly enough in the natural environment to allow restocking with desired species shortly after treatment.

The following examples illustrate the invention in more detail.

EXAMPLE 1

The effect of varying concentrations of juglone on a number of different species of fish was determined. Bioassays were conducted according to the methods of Lennon and Walker (Investigations in Fish Control: 1. Laboratories and methods for screening fish-control chemicals, U.S. Bureau of Sport Fisheries and Wildlife, Circular 185, 1964). Observations on mortality were made at 3 and 6 hours on the first day, and daily thereafter for the remainder of the 96-hour test period. Water used for these tests was a standard assay water having a pH of 7.2 to 7.6; total hardness as $CaCO_3$ of 40–48 p.p.m. and a total alkalinity as $CaCO_3$ of 30–35 p.p.m.

Results of those bioassays are as follows:

TABLE 1.—TOXICITY OF JUGLONE TO FISH IN STANDARD BIOASSAYS AT 12 C.

| Species | LC50 and 95-percent confidence interval in p.p.b. at— | | | | | Mean slope function |
|---|---|---|---|---|---|---|
| | 3 hours | 6 hours | 24 hours | 48 hours | 96 hours | |
| Rainbow trout *Salmo gairdnerii* | 94.0 / 85.2–103.8 | 67.8 / 60.9–75.5 | 41.4 / 37.9–45.0 | 38.2 / 35.2–41.5 | 38.2 / 35.2–41.5 | 1.12 |
| Northern pike *Esox lucius* | 115.0 / 99.5–133.1 | 54.0 / 50.0–58.4 | 31.2 / 26.9–36.2 | 29.0 / 24.7–34.1 | 27.1 / 22.7–32.4 | 1.17 |
| Goldfish *Carcassius auratus* | 891.0 / 712.0–1,110.0 | 390.0 / 323.0–472.0 | 104.9 / 93.0–119.1 | 92.0 / 79.3–106.8 | 81.0 / 71.6–91.5 | 1.30 |
| Carp *Cyprinus carpio* | | 510.0 / 322.0–805.0 | 104.0 / 91.4–118.4 | 88.0 / 74.5–103.9 | 88.0 / 74.5–103.9 | 1.38 |
| White sucker *Catostomus commersoni* | 442.0 / 281.0–697.0 | 164.0 / 137.9–195.2 | 71.3 / 63.6–79.5 | 65.9 / 57.8–75.1 | 60.0 / 53.5–67.2 | 1.37 |
| Black bullhead *Ietalurus melas* | | 595.0 / 521.5–678.6 | 137.2 / 104.9–179.9 | 80.2 / 69.5–92.6 | 75.7 / 64.7–88.5 | 1.33 |
| Channel catfish *Ietalurus punctatus* | 193.0 / 147.2–252.3 | 88.2 / 78.7–98.9 | 37.6 / 31.6–44.8 | 36.7 / 31.1–43.7 | 36.7 / 31.1–43.7 | 1.25 |
| Green sunfish *Lepomis cyanelius* | 300.1 / 263.1–342.0 | 127.7 / 112.0–146.0 | 56.3 / 51.9–60.8 | 46.9 / 43.6–50.5 | 46.9 / 43.6–50.5 | 1.13 |
| Bluegill *Lepomis macrochirus* | 182.0 / 148.6–222.9 | 164.6 / 139.3–194.1 | 52.7 / 48.8–56.9 | 46.9 / 41.1–53.5 | 42.9 / 37.6–48.9 | 1.19 |

As may be seen from the table, juglone was highly toxic to all nine species of fish, representing seven genera, which were used as test subjects. The LC50s (that concentration at which 50 percent of experimental fish were killed) in the 9-hour bioassays ranged from 27 to 88 p.p.b. (parts per billion). Rainbow trout and northern pike were among the most sensitive species while goldfish, carp and black bullheads were most resistant. Mean slope functions were determined for each species. This function is derived from a plot of percent mortality versus juglone concentration; a slope function of 1 being a vertical line. A low value of the slope function indicates that small increases of concentration drastically increases mortality. Thus, for each species, juglone produced complete mortality or permitted complete survival over a narrow range of concentrations.

EXAMPLE 2

Effect of water quality and temperature on the toxicity of juglone toward fish was investigated. A number of different assay waters, ranging from very soft to hard, were prepared. Makeup of these assay waters is set out in the following table:

TABLE 2.—COMPOSITION OF ASSAY WATERS

| Classification of water | Salt added in mg. per l. | | | | pH range | Concentration as p.p.m. CaCO₃ | |
|---|---|---|---|---|---|---|---|
| | NaHCO₃ | CaSO₄ | MgSO₄ | KCl | | Total hardness | Total alkalinity |
| Soft | 12 | 7.5 | 7.5 | 0.5 | 6.4–6.8 | 10–13 | 10–13 |
| Standard [1] | 48 | 30.0 | 30.0 | 2.0 | 7.2–7.6 | 40–48 | 30–35 |
| Medium | 192 | 120.0 | 120.0 | 8.0 | 7.6–8.0 | 160–180 | 110–120 |
| Hard | 384 | 240.0 | 240.0 | 16.0 | 8.0–8.4 | 280–320 | 225–245 |

[1] Standard reconstituted water used in routine bioassay.

Bioassays were performed using these waters in the same manner as was set out in the preceding example. Effect of water temperature in the range of 7° to 22° C. on the toxicity of juglone was also determined. Results of these tests are set out in the following table:

TABLE 3.—TOXICITY OF JUGLONE TO FISH AT DIFFERENT TEMPERATURES AND WATER HARDNESS

| Species | Temp., °C | Water hardness | LC50 and 95-percent confidence interval in p.p.b. at— | | | | | Mean slope function |
|---|---|---|---|---|---|---|---|---|
| | | | 3 hours | 6 hours | 24 hours | 48 hours | 96 hours | |
| Rainbow trout | 7 | Standard | 118.0 / 101.8–137.0 | 90.0 / 80.3–101.0 | 43.8 / 37.6–51.0 | 38.0 / 31.6–45.6 | 34.5 / 29.5–40.4 | 1.23 |
| Do | 12 | do | 94.0 / 85.2–103.8 | 67.8 / 60.9–75.5 | 41.4 / 37.9–45.0 | 38.2 / 35.2–41.5 | 38.2 / 35.2–41.5 | 1.12 |
| Do | 17 | do | 63.4 / 54.6–73.5 | 41.0 / 36.8–45.7 | 34.6 / 30.9–38.8 | 34.0 / 30.6–37.8 | 34.0 / 30.6–37.8 | 1.18 |
| Do | 12 | Soft | | 69.4 / 61.6–78.0 | 46.8 / 41.1–53.4 | 40.0 / 35.5–45.0 | 39.0 / 34.5–44.1 | 1.17 |
| Do | 12 | Medium | | 74.5 / 66.0–84.2 | 43.5 / 38.8–48.7 | 39.0 / 34.5–44.1 | 37.0 / 32.4–42.2 | 1.16 |
| Do | 12 | Hard | | 92.0 / 85.6–99.0 | 46.0 / 40.7–52.0 | 46.0 / 40.7–52.0 | 43.2 / 38.6–48.4 | 1.15 |
| Bluegill | 12 | Standard | 222.0 / 188.0–262.0 | 124.0 / 103.0–149.0 | 66.0 / 62.9–69.4 | 56.0 / 49.5–63.4 | 56.0 / 49.5–63.4 | 1.19 |
| Do | 17 | do | 149.0 / 133.0–167.0 | 98.0 / 89.0–107.9 | 60.0 / 54.0–66.5 | 54.0 / 47.0–62.1 | 54.0 / 46.1–63.3 | 1.25 |
| Do | 22 | do | 138.0 / 122.0–169.0 | 72.0 / 65.0–79.6 | 57.0 / 51.4–63.3 | 57.0 / 51.4–63.3 | 57.0 / 51.4–63.3 | 1.21 |
| Do | 12 | Soft | 182.0 / 148.0–224.0 | 109.0 / 92.5–129.0 | 56.0 / 51.3–61.0 | 44.0 / 40.7–47.5 | 44.0 / 40.7–47.5 | 1.19 |
| Do | 12 | Medium | 233.0 / 193.0–282.0 | 154.0 / 123.0–192.0 | 60.0 / 54.0–66.6 | 53.0 / 49.0–57.3 | 50.0 / 45.8–54.5 | 1.21 |
| Do | 12 | Hard | 248.0 / 216.0–286.0 | 171.0 / 145.0–200.0 | 58.0 / 52.2–64.5 | 52.0 / 46.4–58.3 | 49.0 / 42.2–57.8 | 1.21 |

As may be seen from the table, rainbow trout respond similarly to juglone at the three test temperatures: 7, 12 and 17° C. This indicates the compound to be effective throughout the general range of temperatures normally encountered in trout habitats. Water hardness had no appreciable effect on the toxicity of juglone toward trout except that there was an indication that toxicity dropped slightly in the very hard water.

Bluegills were found to react similarly to trout in waters of differing temperature and hardness. Toxicity of juglone toward bluegills does not appear to vary significantly over the range of water temperatures and hardness tested. These data indicate that juglone is effective in hard, alkaline waters which tend to inactivate other common piscicides.

EXAMPLE 3

In order to be considered as a practical piscicide, not only must a chemical be highly toxic to fish but it must degrade in the environment at a relatively rapid rate to nontoxic forms. However, the chemical must also be persistent enough to thoroughly and completely eradicate target species. These characteristics of juglone are illustrated in the following table.

These data indicate that juglone is inactivated with time both in buffered and nonbuffered bioassay solutions, but not so quickly that target species survive. It is apparent that degradation and breakdown of juglone occur in the natural environment to form nontoxic or less toxic components.

Conventional techniques may be employed for the use of juglone in fish culture. Since juglone is normally a solid, it is most conveniently applied as a dilute solution in any solvent which is at least partially miscible with water. As with any other piscicide, application to a water body must be performed in such a manner that the juglone is distributed relatively uniformly throughout the water mass. In the case of a pond or lake, juglone is most conveniently applied by dispensing a solution of the chemical from a boat. Flowing streams may be treated by metering the chemical into the water at a rate proportional to the stream flow.

Concentration of juglone in the water being treated must be sufficiently high to kill all target species within a reasonably short time; preferably within about 24 hours. If the target species include such relatively resistant fish as carp and bullheads, then juglone concentrations used must be somewhat higher than for other species. Generally treatment levels will be in a juglone concentration range of about 50 to about 500 p.p.b. A preferred treatment level is in the range of about 100 to about 300 p.p.b.

After treatment of the water body with juglone, it is preferred that dead and dying fish be removed and suitably disposed of to avoid water degradation. It is necessary to delay restocking the water body with fish of a desired species for a time sufficient to allow the juglone to degrade to less toxic and nontoxic components. This time period between treatment and restocking will depend primarily upon two factors; the TABLE 4.—THE EXTENT OF DEGRADATION OF JUGLONE WITHIN ONE WEEK IN STANDARD AND BUFFERED WATER AT 12 C. AS INDICATED BY THE TOXICITY TO RAINBOW TROUT

| Degradation time (days) | Test water | LC50 and 95-percent confidence interval in p.p.b. at— | | | | |
|---|---|---|---|---|---|---|
| | | 3 hours | 6 hours | 24 hours | 48 hours | 96 hours |
| 0 | Standard, pH-7.4 | 94 / 80–111 | 66 / 58–75 | 39 / 36–42 | 38 / 36–41 | 36 / 33–40 |
| 7 | Standard, pH-7.4 | 118 / 102–137 | 106 / 88–127 | 60 / 55–65 | 54 / 50–59 | 52 / 46–59 |
| 7 | Buffered, pH-9.0 [1] | | | 158 / 120–209 | 148 / 113–193 | 148 / 113–193 |

[1] Buffered solutions contained 15.5 ml. 1 N NaOH and 25 ml. 1 M H₃BO₃ in 15 liters of test solution.

concentration of juglone used in the treatment step and the sensitivity of the introduced fish species to juglone. Generally the delay between treatment and restocking will vary from about 10 to 60 days. As an added safety measure, it is sometimes appropriate to test the residual water toxicity prior to restocking. This may be easily accomplished by taking sample of the water and observing the behavior of a few fish placed in the water sample over a period of several days. If the fish show no signs of depressed physical activity, then residual juglone levels are sufficiently low to permit restocking in safety.

What I claim is:

1. A method of fish culture which comprises treating a body of water with juglone at a concentration in the range of about 50 to about 500 p.p.b. so as to produce a toxic environment and thereby destroy all undesirable species of fish inhabiting the water, allowing the juglone to degrade into components nontoxic to fish and thereafter introducing a desired species of fish into the treated water body.

2. The method of claim 1 wherein the juglone is in the form of a relatively dilute solution.

3. The method of claim 2 wherein introduction of the desired fish species is delayed for at least about 10 days after treatment of the water body with juglone.

4. The method of claim 3 wherein the water body is treated with juglone at a concentration in the range of about 100 to about 300 p.p.b.

5. The method of claim 4 wherein the juglone solution is metered into a flowing streaming at a rate proportional to the water flow in the stream.

6. The method of claim 4 wherein introduction of the desired fish species is performed within about 10 to about 60 days after treatment of the water body with juglone.

7. The method of claim 4 wherein the water body comprises hard, alkaline water.